UNITED STATES PATENT OFFICE.

FREDERICK P. BURR, OF MIDDLETOWN, CONNECTICUT.

BATH AND SHAMPOOING COMPOUND.

1,360,093.     Specification of Letters Patent.     Patented Nov. 23, 1920.

No Drawing.     Application filed August 20, 1919. Serial No. 318,739.

*To all whom it may concern:*

Be it known that I, FREDERICK P. BURR, a citizen of the United States, residing at Middletown, in the county of Middlesex and State of Connecticut, have invented certain new and useful Improvements in Bath and Shampooing Compounds, of which the following is a specification.

My invention relates to improvements in bath and shampooing compounds, and the object of my improvement is to produce a compound in the form of a powder that can be added to water for use in the bath and as a hair wash and shampoo, and that will serve efficiently in cleansing the skin and the hair and will leave them in relatively moist condition.

In carrying out my invention I make use of two main ingredients, to which may be added some other ingredient for imparting additional characteristics to the compound, and there may be a further addition in the form of a perfume, as violet or rose.

One of the said main ingredients consists of a mild alkali, and one that is suited to the purpose is bi-carbonate of soda, and in the case of the compound used for a shampoo I use of this ingredient a quantity such as to constitute nearly two-thirds of the bulk of the compound.

The second main ingredient is used in the shampooing compound in such quantity as to constitute nearly one-third of the bulk and is of peculiar form, in that it consists of milk in the form of a solid, as distinguished from liquid, and is the product that is obtained by the evaporation of milk.

These two ingredients constitute when combined an operative compound that is useful for the purpose specified.

In use, the soda has an alkaline effect in overcoming or neutralizing the fatty oils with which it comes in contact, such oils being found in the milk ingredient and in surface layer of the skin and scalp and the hair, and in order to operate on the skin and scalp and hair there needs to be a surplusage of soda over what may be needed to simply operate on the milk ingredient.

The proportion given above applies to the milk ingredient in the form that is obtained from skim milk.

Whole milk could be used, but would be relatively wasteful and uneconomical, with no compensating advantage, as, for the reasons given, a relatively greater proportion of soda would be needed to overcome the relatively greater proportion of fat contained therein.

A teaspoonful of the compound as described above when added to a basin of water will answer generally for a single application or use.

I find that the beneficial effects of the compound as described above may be materially enhanced by the addition of an extra ingredient in the form of aromatic peppermint oil to the extent of from one to three per cent.

The qualities of this additional or extra ingredient are well known, and, as is understood, it owes its chief value to its content of menthol, an alcohol having the formula $C_{10}H_{19}OH$, and some of the esters of menthol, principally menthol acetate, and which in itself is beneficial and is desirable to use in the bath because of the agreeable effect or result.

In use, the bi-carbonate of soda, by reason of its properties as a mild alkali, operates to effect the cleaning by acting upon the grease on the skin, and the effect of the milk is to provide a soothing coating to the cleansed skin surface, and the peppermint oil operates as an antiseptic.

The ingredients are combined as a mechanical mixture, in the form of a powder, the oil being absorbed by the other two ingredients, comprising the soda and the dried milk, each of which is in the form of a powder.

I claim as my invention:—

A bath and shampooing compound comprising a mechanical mixture in the form of a powder, and comprising a large proportion of a mild alkaline ingredient and a second ingredient of dried milk.

FREDERICK P. BURR.